United States Patent [19]
Harper et al.

[11] 3,810,468
[45] May 14, 1974

[54] SORBENT

[75] Inventors: Billy G. Harper; Robert N. Bashaw; Bobby L. Atkins, all of Lake Jackson, Tex.

[73] Assignee: The Dow Chemical Company, Midland, Mich.

[22] Filed: June 8, 1972

[21] Appl. No.: 260,994

Related U.S. Application Data

[63] Continuation-in-part of Ser. No. 553,684, May 31, 1966, Pat. No. 3,520,925.

[52] U.S. Cl............... 128/156, 117/136, 128/284, 260/88.1
[51] Int. Cl...................... A61l 15/00, A61f 13/16
[58] Field of Search........... 128/156, 284, 287, 290, 128/296

[56] References Cited
UNITED STATES PATENTS

| | | | |
|---|---|---|---|
| 3,024,207 | 3/1962 | Shaw et al. | 128/290 R |
| 3,078,849 | 2/1963 | Morse | 128/290 R |
| 3,123,075 | 3/1964 | Stamberger | 128/287 |
| 3,340,875 | 9/1967 | Dudley et al. | 128/290 R |
| 3,419,006 | 12/1968 | King | 128/156 |
| 3,628,534 | 12/1971 | Donohue | 128/285 |
| 3,664,343 | 5/1972 | Assarsson | 128/285 |
| 3,669,103 | 6/1972 | Harper et al. | 128/284 |
| 3,670,731 | 6/1972 | Harmon | 128/284 |

*Primary Examiner*—Charles F. Rosenbaum
*Attorney, Agent, or Firm*—Richard W. Hummer; A. Cooper Ancona

[57] ABSTRACT

Articles having improved sorbency for aqueous body fluids are provided wherein novel classes of water-swellable, water-insoluble, lightly cross-linked polymers are employed as sorbents in conjunction with a body-conforming support.

7 Claims, No Drawings

SORBENT

CROSS-REFERENCE TO RELATED APPLICATION

This application is a continuation-in-part of our copending application, Ser. No. 553,684, filed May 31, 1966 now U.S. Pat. No. 3,520,925.

BACKGROUND AND SUMMARY OF THE INVENTION

The present invention is concerned with the relatively stable sorption of aqueous fluids and is particularly directed to substances which do sorb, structures which carry the said sorbent substances, and methods for the sorption of aqueous fluids particularly in situations in which it is desired to sorb the aqueous fluid stably and in a manner which is reversible only with great difficulty.

The present invention finds its principal use in the sorption of fluids elaborated in the normal or pathological functioning of the body of a warm-blooded animal. In some circumstances it is more widely usable and may be employed wherever it is desired to sorb an aqueous fluid. The sorbents of the present invention are polymers, typically polymers or copolymers derived from monomers which, or a major proportion of which, homopolymerized alone, would be water-soluble; but are here lightly corss-linked in manners known in polymer synthesis and preparation.

The monomers to be employed are generally difunctional, in the sense that each unit contains a functional group adapted to undergo polymerization to yield linear polymers and by the fact that each unit contains a hydrophilic group so that if such monomer is homopolymerized, the homopolymers are water-soluble. However, it is pointed out that mixtures of these monomers can also be polymerized to obtain copolymers including terpolymers and polymers presenting a wide variety of monomeric members. If not cross-linked, as by polymerizing in mixture with polyfunctional, cross-linking monomer, these copolymers are also water-soluble.

In the present invention, lightly cross-linked polymers otherwise as described above, including mixed polymers representing diverse monomeric species, are not only to be employed, but represent some of the most effective embodiments of the invention.

When it is desired to obtain recurring moieties of some kinds, such as carboxyl-bearing and carboxylate-bearing moieties, sulfonate and sulfone-bearing moieties, and the like, the synthetic route of choice may not call for the monomers bearing such functions. Rather it may be less expensive to provide a monomer which, after polymerization, admits of ready modification to provide such function.

Thus, for instance, when a polymer is desired that may appear to be a copolymer of acrylamide and acrylate, it may be preferred to produce first a homopolymeric acrylamide and, after polymerization, to hydrolyze in part, to obtain a product as though a copolymer of acrylamide and acrylic acid, and thereafter to neutralize the carboxyl groups produced by hydrolysis. Similarly, polyvinyl alcohols are prepared by polymerizing a vinyl alkanoate such as vinyl acetate and thereafter hydrolyzing to obtain the desired hydrophilic polymer. In a further method lightly cross-linked polyacrolein can be reacted with alkali metal bisulfite to introduce a plurality of hydrophilic sulfonate groups or with a strong alkali in a Cannizaro reaction to introduce a plurality of hydroxyl and carboxyl groups.

It is immaterial in the present invention whether a copolymeric material here to be employed be prepared by supplying separate monomers and thereafter copolymerizing them, or by supplying monomer of one kind, homopolymerizing, and thereafter modifying a part, only of the resulting recurring moieties, to attain essentially the same product as would be attained from copolymerization.

Cross-linking necessary to the present invention is readily achieved in manners known in the polymer arts, as, by irradiation, or the incorporation into a monomer mixture to be polymerized of known chemical cross-linking monomeric agents such as divinylbenzene, the divinylether of diethylene glycol, N,N'-methylenebisacrylamide and the like. The manner of cross-linking is not critical. When a monomeric difunctional chemical cross-linking agent is incorporated into a monomer mixture to be polymerized to obtain a naturally cross-linked polymer (which is actually a copolymer by reason of the presence of the cross-linking agent) to be used according to the present invention, usually from about 0.05 to about 1.5 percent of cross-linking agent and preferably about 0.10 to about 0.9 percent of cross-linking agent by weight of total monomers present will yield products of preferred properties. When cross-linking is induced in known manners by radiation, about the same degree of cross-linking should be achieved.

In an alternative method of cross-linking, a portion of the functional groups, such as hydroxyl, carboxyl or amido groups, of a preformed water-soluble or potentially water-soluble polymer is reacted with a difunctional compound in which the functional groups are capable of reacting to form strong chemical bonds with the functional groups of the polymer. Thus, for example, a polymer containing potential hydrophilic carboxyl groups such as an olefin-maleic anhydride copolymer can be reacted with a small amount of a diol such as glycol or polyglycol to effect cross-linking by means of ester linkages or with a diamine such as ethylene diamine or a polyalkylene polyamide to effect cross-linking by means of amide linkages. Similarly, a polymer containing a plurality of alcoholic or phenolic hydroxyls can be cross-linked by reaction with a polyfunctional acid, acid anhydride or acid chloride; thus, for example, polyvinyl alcohol can be cross-linked by reaction with boric acid, citric acid, maleic anhydride, succinic anhydride, succinyl chloride or the like. Further, polymers containing a plurality of amino or amido groups are cross-linked by reaction with formaldehyde or with various dialdehydes such as glyoxal, glutaric aldehyde or the like.

Those skilled in the polymer art will recognize that, for purposes of this invention, the extent of cross-linking desired is enough to render the resulting cross-linked polymers water-insoluble, greatly water-swellable, bibulous; the separate particles, when swollen by imbibition of an aqueous fluid, not coalescing but remaining discrete although possibly moderately coherent. In general, operable cross-linked polymers should imbibe at least about 15 grams of water or body fluid per gram of dry polymer.

Example 1

A 50 percent aqueous solution of N-vinylpyrrolidone monomer was exposed for two hours in a reaction vessel to a gamma ray source providing radiation at the rate of 0.16 megarad per hour. Under the radiation bombardment, in manners incompletely known as to chemical mechanism but well defined as to results, the monomer was polymerized and lightly cross-linked, and the preparation which entered the reactor as a non-viscous aqueous solution was brought out as an insoluble, deformable soft solid.

This substance was cut into dice and subdivided so as to provide large surface exposure to evaporative removal of water. Water was thereafter evaporated to substantial dryness and, as desired, the product was further finely ground or pulverized to obtain a finely particulate sorbent.

Example 2

In a 3 liter flask were combined 450 grams monomeric N-vinylpyrrolidone, 2.25 grams of the $\alpha,\omega$-divinylether of diethylene glycol, 0.45 milliliter of 1-amino-2-propanol, and, as polymerization catalyst, 0.90 grams of $\alpha,\alpha'$-azobisisobutyronitrile, all these substances together with 1,800 milliliters water. The resulting mixture was heated at 70–80°C. for 8 hours under nitrogen blanket and with continuous nitrogen purge. As a result of these operations there was obtained, in aqueous dispersion, a lightly cross-linked polymer of N-vinylpyrrolidone cross-linked with the saturated residue of the divinyl ether of diethylene glycol. The resulting preparation was removed from the flask in which it was prepared, placed on trays and warmed in a vacuum evaporator to remove water and obtain the lightly cross-linked polymer as a glassy solid. The resulting polymer solid, in irregular form was thereafter ground to desired fineness to obtain a usable powder.

Example 3

In a 3 liter flask were combined 100 grams monomeric N-vinylpyrrolidone, 0.7 grams N,N'-methylenebisacrylamide and, as polymerization catalyst 0.3 grams $\alpha,\alpha'$-azobisisobutyronitrile, all these substances mixed together with 500 milliliters water. The resulting mixture was heated at 70–80°C. for 8 hours under nitrogen blanket and with stirring and with continuous nitrogen purge, to obtain, in aqueous dispersion, a polymer of N-vinylpyrrolidone lightly cross-linked with the saturated residue of the N,N'-methylenebisacrylamide. The resulting product was a coherent mass of gel with no visible amounts of unretained aqueous liquid.

The gel was removed from the flask, placed in a glass pan in a vacuum evaporator, and with warming and under subatmospheric pressure, water was evaporated to apparent product dryness.

Example 4

In preparations essentially the same as those of Example 3 foregoing but employing 100 grams monomeric N-vinylpyrrolidone and 0.5 percent divinylbenzene there was obtained a gel which, upon preparation, evaporative drying, grinding, and rewetting, sorbed to obtain a loosely associated particulate gel, in which 2 weight percent of polymer held 98 weight percent of water readily.

Cross-linked polyglycol polymers, which may be regarded as certain highly specialized forms of polyurethane polymers are also useful in the present invention, including the polymers set forth in U.S. Pat. Nos. 3,054,778 and 3,164,565.

Example 5

The procedures of Examples 1, 2 and 3 are repeated employing vinylmorpholinone in place of vinylpyrrolidone. Highly water-swellable, lightly cross-linked polymer products are obtained.

Example 6

The following procedure is carried out for the preparation of a water swellable polyglycol.

Into a mixing kettle containing 6,000 pounds of kerosene was added 2.5 percent by weight of Bentone 38 based on kerosene.

The expression "Bentone" is a registered trade mark for a group of ion-exchange modified clays. Bentone 38, in particular, is a dimethyl-di (tallow oil alkyl) ammonium derivative of a magnesium montmorillonite (Hectorite Clay). It was used here as an aid to particulating the resulting polymer. Then acetone (40 percent by weight based on Bentone) was added to aid the dispersion of the Bentone. This mixture was then agitated by stirring until its viscosity was greater than 300 centipoises. About 4800 pounds of dry polyethylene glycol of average molecular weight of about 9,000 was fed into the reactor which had been heated to 90°C., at a rate of about 1,000 to 1,250 pounds per hour. The temperature was maintained at 80–90°C. A heat stabilizer product was then added to the mixture and the temperature raised to 110°C. The stoichiometric amount of toluene diisocyanate (TDI) based on the hydroxyl groups present in the polyglycol was then added, that is, one-half mole of TDI for each hydroxyl group, followed by a quantity of triethylene diamine sufficient to obtain a pH of 8–9 in the mixture. The reaction was allowed to continue for 1 hour at 80°C.

The reaction was stopped by adding 15 percent HCl to the slurry until the pH was 5 or 6. The particulate lightly cross-linked polyethylene oxide product polymer was separated from the slurry by filtration and the excess kerosene absorbed by Fuller's earth which was then separated by sieving from the larger particles of polymer.

Example 7

Into a bottle of approximately 100 milliliters capacity was measured 50 milliliters citrated whole human blood. Thereto was added a product from the crosslinking of a polyglycol with toluenediisocyanate, such as that of Example 6. The polyglycol was a polyethylene glycol of average molecular weight about 9,500, a specific gravity of 1.212 at 25 as referred to water at the same temperature; before cross-linking, soluble in all proportions in water; but cross-linked by reacting it with a small amount of toluenediisocyanate. The resulting polymer, loaded by sorption with blood, yielded a particulate gel, the particles of which absorbed blood relatively more slowly than the polymers described foregoing, but completely and practically irreversibly.

Example 8

The present example was carried out in a manner essentially similar to the foregoing, except that the employed polymer was prepared from a polyethylene glycol having an average molecular weight of approximately 20,000, more lightly cross-linked with toluene diisocyanate, and the resulting gel, from the dispersion of 2 weight percent of the said polymer into 98 weight percent of blood, was somewhat less particulate than the particle of Example 7, foregoing, formed more quickly, and deemed more useful in the stanching of blood flow.

It has now been discovered that various classes of polymers and copolymers not previously specified for such use have excellent properties for imbibing and binding water and aqueous body fluids. Thus, for example, various copolymers of mono-olefinic compounds with maleic anhydride can be lightly cross-linked and reacted with ammonia or alkali to produce water-insoluble, highly water-swellable polymer products. In such operations maleic anhydride is copolymerized by known methods with an olefin such as ethylene, propylene, butylene or isobutylene, with a vinyl aromatic such as styrene, alpha-methylstyrene or vinyl toluene, with a vinyl ether such as vinyl methyl ether, vinyl ethyl ether or methyl isopropenyl ether, or with a vinyl heterocyclic compound such as vinyl morpholinone, vinyl pyrrolidone or vinyl oxazolidinone. Various mixtures of such monomers can be copolymerized with maleic anhydride to produce terpolymers, tetrapolymers and the like provided with the final polymer product contains a sufficient proportion of hydrophilic or potentially hydrophilic groups to assure the desired degree of sorbency for aqueous fluids.

As described above, the desired cross-linking can be introduced into the maleic anhydride copolymers by including in the monomer charge from about 0.05 to about 1 percent of a divinyl or polyvinyl monomer, such as divinylbenzene or the divinyl ether of diethylene glycol. Alternatively, the olefin-maleic anhydride copolymer is prepared as a substantially linear polymer and is then reacted with a diol such as ethylene glycol, diethylene glycol, 1,4-butandiol, dipropylene glycol or the like to introduce diester cross-linking or with a diamine such as ethylenediamine or a polyalkylene polyamide to introduce diamide cross-linking. Similarly other difunctional or polyfunctional reactants such as ethanolamine, diethanolamine or the like can be employed to introduce mixed cross-linking functions. In any case, the lightly cross-linked maleic anhydride copolymers are rendered hydrophilic by hydrolysis or ammonolysis of the anhydride groups. Thus, such copolymers may be treated with liquid or gaseous ammonia to convert each maleic moiety to the half-amide, half-ammonium salt form or with an aqueous or alcoholic solution of an alkali metal hydroxide to produce the corresponding alkali metal salt form of the maleic moieties. Where the copolymer is cross-linked with alkali-sensitive groups such as ester groups the treatment with ammonia or alkali metal hydroxide must be conducted under mild conditions to avoid breaking the cross-linkages.

Another class of useful sorbent polymers is derived from lightly cross-linked polyacrolein. The latter can be prepared by radiation cross-linking, by copolymerizing acrolein with a small amount of a divinyl compound or by reacting linear polyacrolein with a difunctional reactant such as a diamine. The resulting cross-linked polyacrolein is then reacted with strong alkali to introduce a plurality of alcoholic hydroxyl and alkali metal carboxylate salt groups or with an alkali metal acid sulfite to introduce a plurality of alkali metal sulfonate salt groups whereby the final product acquires the requisite degree of hydrophilicity.

Yet another class of sorbent polymers is provided by lightly cross-linked copolymers of allyl alcohol, allyl-polyol ethers or the like with sulfur dioxide. Terpolymers with additional copolymerizable monomers may also be employed, for example, as shown in U.S. Pat. Nos. 2,778,812; 2,794,014 and 3,308,102. Preferred copolymers are obtained by cross-linking allyl glycerol-$SO_2$ copolymer, allyl alcohol-$SO_2$ copolymer, or a copolymer of $SO_2$ with an allyl ether of a glycol or polyglycol.

Other polymer products suitable for use in the invention include lightly cross-linked polyvinyl sulfonic acid and its ammonium and alkali metal salts as well as lightly cross-linked copolymers of vinyl sulfonic acid with various compatible hydrophilic monomers such as acrylamide, methacrylamide, acrylic acid, methacrylic acid, hydroxyalkyl acrylates, itaconic acid and its ammonium and alkali metal salts, allyl alcohol and various allyl ethers, acrolein, vinyl methyl ether and the like.

Other suitable polymers can be prepared by copolymerizing vinylene carbonate with the numerous vinyl monomers previously mentioned, of either hydrophobic or hydrophylic character. The carbonate moiety would then be subsequently hydrolyzed leaving pendant hydroxyl groups and the polymer crosslinked either during or after the initial copolymerization.

It is also apparent that various derivatives of lightly crosslinked polyethylene oxide may advantageously be used. These would encompass polymers with polyethylene oxide backbones having pendant hydroxyalkyl, carboxylic, or sulfonic acid salt groups and the like. For example t-butyl glycidyl ether is polymerized then dealkylated to remove the t-butyl group thus leaving pendant hydroxymethyl groups. The resulting polymer is crosslinked for use as a gelling agent or the hydroxyls may be further modified by oxidation or sulfonation.

It will be apparent that various of the above-described monomers can be combined to prepare sorptive copolymers, terpolymers, tetrapolymers and the like. In such operations any of the hydrophilic monomers may be employed as a major proportion of the final polymer product. In addition various monoolefinic monomers having hydrophobic properties may be employed as diluent monomers or chain extenders provided the latter are employed in sufficiently small proportions that the final polymer product maintains the desired degree of sorbency for aqueous fluids.

Example 9

100.6 Grams of maleic anhydride and 109.4 grams of styrene are dissolved together in 600 grams of acetone in a 1-liter resin kettle fitted with a thermometer, stirrer, condenser and a line for purging with an inert gas. The resulting mixture is stirred for 30 minutes while passing nitrogen gas through the purge line and thereafter 0.6 milliliters of tertiary butyl peroxypivalate is added as a catalyst. The temperature of the reaction mixture is raised to 40°C. and maintained at about this temperature for about 16 hours to produce the styrene-maleic anhydride copolymer intermediate in the form of an acetone solution. Thereafter diethylene glycol is added to the solution in the amount of 0.5 percent by weight based on the weight of copolymer to serve as a cross-linking agent. The resulting solution is forced through an orifice into a current of warm air to evaporate the solvent and obtain the copolymer in the form of a fine filament. These filaments are heated for 2 hours at about 50°C. to complete the cross-linking reaction and are then placed in a pressure vessel and treated with gaseous ammonia at a pressure of 20 pounds per square inch for a period of 16 hours to convert the maleic anhydride moieties to the half amide-half ammonium salt form. Weighed quantities of the filamentous polymer product are immersed in excess aqueous fluids and after imbibing water from said fluids are drained and reweighed. It is found that the polymer sorbs 600 grams of fluid per gram of polymer from distilled water and 52.5 grams of fluid per gram of polymer from a 0.27 normal sodium chloride solution.

Similar sorptive copolymers are obtained when the foregoing is repeated substituting tetraethylene glycol, 2--butyne-1,4-diol or 1,5-pentanediol for the diethylene glycol employed above as cross-linking agent.

Example 10

Following the general procedures of U.S. Pat. No. 2,794,014, equimolar proportions of allyl alcohol and sulfur dioxide are copolymerized using a persulfate catalyst and with the addition of 0.5 percent by weight of acrylic acid based on the weight of other monomers present. On drying the copolymer product, a water-insoluble, water-swellable polymer is obtained. Similar desirable polymers are obtained if an allyl ether of ethylene glycol or a polyethylene glycol or an allyl ether of glycerol is substituted for all or part of the allyl alcohol is this preparation.

Because in diaper and similar use, support is considered to be essential and critical to the best use of the polymers herein, but because sorbency is a property manifest by the polymers rather than by the support, it is contemplated also to employ an essentially water-impermeable support which can be a resinous, water-insoluble polymeric sheet material, such as sheet polyethylene, polyvinyl chloride, reconstituted cellulose, and the like.

This can be used as sole support, or as a shield or barrier layer in conjunction with a permeable support structure such as a fabric.

In view of the general teaching hereinbefore embodied and the examples set forth, those skilled in the art of preparation of absorptive members for sorption of aqueous fluids will find numerous other embodiments within the scope of the present invention.

In the present specification and claims use of the term "animal" is intended to comprehend human beings.

It is uniformly characteristic of the polymers of the present invention that a graph representing, vectorially, water absorption as a function of applied pressure and, reciprocally, water desorption or expression as a function of applied pressure, presents a pattern that can be regarded as a hysteresis loop. It is an especially advantageous characteristic of the water sorption of the polymers of the present invention that this hysteresis loop indicates an outstanding spread between the conditions necessary to effect absorption of aqueous fluids and the conditions under which pressure desorption or release results. Because of this characteristic property, the present substances are extraordinarily advantageous for use in situations in which it is desired to sorb large quantities of aqueous fluid and retain them securely in the face of pressures deformative of the polymer sorbent. Over a relatively wide range of water absorption concentration, it can be generalized that pressure and physical deformation alone have essentially no effect upon the release of water from the polymers of the present invention.

Illustrative of the importance of this fact, a baby diaper prepared from a water-insoluble supporting structure which can be fabric, and carrying, in a way to be retained as in a closed bag, particulate sorbent of the present invention, absorbs large quantities of aqueous fluid with essentially no tendency to release the fluid when exposed to pressure and deformation of the resulting mass of fluid-bearing polymer. In contrast, a sponge or an absorbent cotton fabric manifests a very low spread of the said hysteresis loop at more than minimal water absorption concentrations. Also, the polymers of the present invention, when sorbed with relatively large amounts of water, have little tendency to synerese. Thus, in contrast with thermosoluble polymers such as gelatin and pectin, at relative levels of water concentration in which syneresis would be conspicuous, surfaces of the present polymer show little or no tendency to "bleed."

With only minimal attention to the identity of the chosen polymer, all the polymers of the present invention and in particular, fabricated articles presenting the polymers but supporting them are adapted to be employed in a wide range of sorptive functions. It is expressly contemplated that they will be used in bandages, surgical tampons, sorptive dental rolls, catamenial tampons, sanitary napkins, diapers, body urinals for use by persons suffering urinary incontinence, in which application the employment of the polymers in a thin plastic film bag provides an easily disposable unit, and the particulate polymers may well be employed; pads for the absorption of perspiration as in the underarm region; breast pads for the sorptive interception of milk; disposable sorbent hat bands, and in conjunction with drains, and similar surgical and medical means employed in the management of bodily fluids.

Example 11

An experimental baby diaper is prepared by providing a first outer layer of thin plain nylon broadcloth approximately 20 inches square. Over and upon this, avoiding approximately 2 inches of outer edge is applied approximately 2 grams, relatively uniformly, of finely subdivided cross-linked copolymer of styrene and maleic anhydride in sodium salt form as prepared in Example 9. Over this copolymer is applied a second fabric layer essentially the same as the first. With minimal disturbance of the distribution of the polymer, the two layers are sewed together by quilting at regular half-inch intervals and securely hemmed at the edge. In the resulting diaper, the confining nylon fabric layers have so little sorptive quality as to be ignored.

After completion of its fabrication, the diaper is weighed, and thereafter put into use in personal management of a baby of approximately 6 months age.

After approximately four hours, the diaper is removed and re-weighed. The weight gain is found to be approximately 120 grams, representing the take-up of approximately 60 weights of urine per weight of polymer employed.

Example 12

The present example essentially repeats Example 11, foregoing, except that, in preparation, the particulate polymer is lightly moistened and, with continuous stirring, modified by the inclusion therein of a non-toxic antiseptic adapted for external use ("hexachlorophene").

The polymer is thereafter dried and reground, and employed in exactly the manner described in Example 11 foregoing.

The diaper of the present example and that of Example 11, foregoing, are used in essentially similar manners, are loaded with urine in approximately similar amounts, and are thereafter separately disposed in loosely closable vessels employed to hold used baby diapers.

In these vessels, they are held in unmodified condition for two days, the vessels thereafter opened and inspected.

The vessel in which the unmodified diaper is disposed presents a strong odor of ammonia. The vessel in which the polymer is modified by the employment of the antiseptic has little or no odor.

Example 13

In the present example, a linear, water-soluble homopolymer of N-vinyl pyrrolidone is dissolved in water to form a viscous solution which is then extruded through a spinnerette into a moving current of hot air to form fibers. These fibers, still containing a small amount of water, are then irradiated with gamma rays to effect crosslinking to make a water swellable, water insoluble polymer fiber. Together with synthetic cellulose ester fibers as mechanical support, the two kinds of fibers in approximately equal weights, dry, it is felted and fixed to obtain a "non-woven" fabric. This is employed as a baby diaper and, when accompanied by conventional waterproof outer covering, is completely satisfactory.

Example 14

A viscous aqueous 5 percent by weight solution of a partially hydrolyzed (29 mole percent) polyacrylamide is warmed to 40°C. and extruded through a spinneret nozzle to form solvated fibers. The fibers are partially dried and conveyed to a screen by an airblast to produce a mat of fibers which is then conditioned by exposure to formaldehyde vapors for 30 minutes and thereafter cured at 110°C. for 1 hour to accomplish the crosslinking reaction.

The water-insoluble, water-swellable fibers can be woven or knitted, if the felted fabric is, in any application, unsatisfactory.

It is contemplated that, in practical use, the confining structure for particulate polymers of the present invention need not be an expensive fabric. In view of the described difficulty of removing aqueous fluids from the polymer of the present invention, it is contemplated that a disposable diaper will be of greater use than one intended for processing and reuse.

Thus, instead of the nylon fabric above described in the experimental diapers, it is contemplated that wet-strength, perhaps creped paper and the like will be employed as confining structures. In such application, in view of the rapid and prolonged imbibition of aqueous fluids characteristic of the present polymers, it will be necessary to distribute the polymer over only relatively small portions of the entire diaper area, and unnecessary to distribute it over portions of which the essentially only function is to permit bodily attachment. In fact, by the use of a belt or the like whereby to hold a very small diaper in position, it is contemplated that the employment of a relatively small diaper, carefully positioned, will give entirely satisfactory results.

Example 15

A linear polyvinyl alcohol is put into water to make a 7 percent solution and is irradiated with about 8 megarads of gamma radiation which is sufficient to lightly cross-link the polymer. The resulting polymer is dried and ground to a fine powder and thereafter is found to have a gel capacity of about 30. The resulting cross-linked polyvinyl alcohol performs well in a support as a baby diaper.

We claim:

1. In an article of manufacture consisting of a flexible support confining a dry, solid, water-swellable, water-insoluble polymeric sorbent so as to present said sorbent for the sorption of aqueous fluid elaborated by an animal to which said article is applied, the improvement which consists in employing as said sorbent a lightly cross-linked polymer selected from the group consisting of polymers and copolymers of vinyl morpholinone, polymers and copolymers of vinyl sulfonic acid and their ammonium and alkali metal salts, amides and alkali metal or ammonium salts derived from copolymers of maleic anhydride with vinyl methyl ether, with vinyl-pyrrolidone, with vinyl morpholinone or with a mono-olefinic hydrocarbon, polymers and copolymers of acrolein modified by reaction with an alkali metal hydroxide or alkali metal bisulfite and copolymers of sulfur dioxide with allyl alcohol, allyl ether of glycerol or allyl ether of ethylene glycol or a polyethylene glycol.

2. Article of claim 1 wherein the sorbent is a polymer or copolymer of vinyl morpholinone.

3. Article of claim 1 wherein the sorbent is an amide or alkali metal or ammonium salt derived from a copolymer of maleic anhydride with a mono-olefinic hydrocarbon.

4. Article of claim 3 wherein the sorbent is derived from a copolymer of maleic anhydride with styrene, ethylene, propylene, butylene or isobutylene.

5. Article of claim 3 wherein the sorbent is derived from a copolymer of maleic anhydride with styrene.

6. Article of claim 3 wherein the sorbent is derived from a copolymer of maleic anhydride with isobutylene.

7. Article of claim 1 wherein the sorbent polymer has a degree of cross-linking within the range of the degrees of cross-linking obtained by copolymerizing a mono-olefinic monomer with from about 0.05 to about 1.5 percent by weight of a divinyl compound.

* * * * *

UNITED STATES PATENT OFFICE
CERTIFICATE OF CORRECTION

Patent No. 3,810,468      Dated May 14, 1974

Inventor(s) Billy G. Harper, Robert N. Bashaw, Bobby L. Atkins

It is certified that error appears in the above-identified patent and that said Letters Patent are hereby corrected as shown below:

Page 1 after [63] "Pat. No. 3,520,925" should read ---Patent No. 3,669,103---;

Column 1, line 7, "U.S. Pat. No. 3,520,925" should read ---U.S. Pat. No. 3,669,103---;

Column 1, line 28, "corss-linked" should read ---cross-linked---;

Column 5, line 21, "with" should read ---that---;

Column 6, line 20, "hydrophylic" should read ---hydrophilic--

Signed and sealed this 4th day of February 1975.

(SEAL)
Attest:

McCOY M. GIBSON JR.
Attesting Officer

C. MARSHALL DANN
Commissioner of Patents